United States Patent
Rubright

[15] 3,654,382
[45] Apr. 4, 1972

[54] GROMMET CONSTRUCTION

[72] Inventor: Phillip L. Rubright, Berkley, Mich.
[73] Assignee: Arco Industries Corporation, Detroit, Mich.
[22] Filed: June 1, 1970
[21] Appl. No.: 42,331

[52] U.S. Cl. ..................174/153 G, 16/2, 248/56, 277/189, 285/162, 339/128
[51] Int. Cl. ..........................F16l 5/00, H01b 17/26
[58] Field of Search..........174/65 G, 151, 152 G, 153 G; 16/2; 24/141, 142; 248/56; 277/166, 178, 189; 285/159, 162, 192, 193, 194, 208; 339/128

[56] References Cited

UNITED STATES PATENTS

| | | | |
|---|---|---|---|
| 2,206,913 | 7/1940 | Miller | 339/128 |
| 2,664,550 | 12/1953 | Howard | 339/128 |
| 2,706,647 | 4/1955 | Gillespie | 285/162 |
| 3,065,035 | 11/1962 | Biesecker | 339/128 UX |
| 3,182,119 | 5/1965 | Millard | 174/153 G X |

Primary Examiner—Laramie E. Askin
Attorney—McGlynn, Reising, Milton & Ethington

[57] ABSTRACT

An improvement in the grommet construction shown in U.S. Pat. No. 3,182,119 wherein an elastomeric body is formed with an opening having a sealing surface for engaging a member to be supported by the grommet with a base member of non-elastomeric material embedded in the elastomeric body and having a plurality of integral fingers projecting from one side of the elastomeric body for retaining the grommet on a panel having an opening to be sealed by the grommet. In the improvement, each of the fingers has a resilient locking tang struck therefrom which extends outwardly from the respective finger and projects away from the outer end of the respective finger toward the elastomeric body, the tang being resiliently deflectable toward its respective finger when the finger is inserted in a panel opening until the free end clears the opening and snaps into engagement with the opposite side of the panel from the elastomeric body to secure the grommet to the panel and hold the elastomeric body in sealing engagement with the panel.

8 Claims, 4 Drawing Figures

PATENTED APR 4 1972　　3,654,382

INVENTOR.
Phillip L. Rubright
BY
Barnard, McGlynn & Reising
ATTORNEYS

GROMMET CONSTRUCTION

This invention relates to grommets of the type used to support a member such as a wire, conduit, cable, rod or the like that extends through a panel.

U.S. Pat. No. 3,182,119 discloses a grommet construction having an elastomeric body with a base member in the form of a ring of non-elastomeric material embedded in the elastomeric body. A plurality of resilient fingers are formed on the base member and project axially from one side of the elastomeric body. One of the fingers is shaped in the form of a hook to engage the edge of an opening in a panel, and the others of the fingers are shaped in the form of spring members having a portion shaped to resiliently snap by and engage the edge of an opening in a panel to pull the contacting surface of the elastomeric body into sealing engagement with the surface of the panel surrounding the opening. Thus, to mount the grommet in the panel opening, the hooked finger is first positioned over the edge of the panel opening, and the grommet is then pushed against the panel until the spring fingers snap into engagement with the edge of the panel opening. The grommet can be removed from the panel when an axial force is applied to the grommet sufficient to overcome the spring force of the fingers to cause them to be resiliently disengaged from the edge of the opening.

An object of this invention is to provide an improved construction for the above type of grommet wherein the grommet is more positively secured in place on the panel and cannot be removed by merely overcoming a spring force.

A further object is to provide an improved grommet construction of the type referred to above that can be mounted on a panel in sealing engagement with the panel and which is self-locking and cannot be removed by merely overcoming an axial spring force.

A further object is to provide an improved grommet construction of the type referred to above that can be mounted on a panel in sealing engagement with a concave, convex, or other non-flat surface of the panel.

The foregoing and other objects are achieved according to the present invention by the provision of a grommet having an elastomeric body formed with an opening having a sealing surface for engaging a member such as a wire, conduit, cable, rod or the like to be supported by the grommet with a base member of non-elastomeric material embedded in the elastomeric body. The base member has a plurality of integral fingers which project from one side of the elastomeric body, and each of the fingers has a resilient locking tang struck therefrom. Each of the locking tangs extends outwardly from its respective finger and projects away from the outer end of the respective finger toward one side of the elastomeric body with the free end of the tang being spaced from the elastomeric body. The tangs are resiliently deflectable toward their respective fingers when the fingers are inserted in a panel opening until the free ends of the tangs clear the opening and snap into engagement with the opposite side of the panel from the elastomeric body to secure the grommet to the panel and hold the elastomeric body in sealing engagement with the panel.

Other objects, advantages and features of the invention will become apparent from the following description taken in connection with the accompanying drawings in which.

Figure 1:
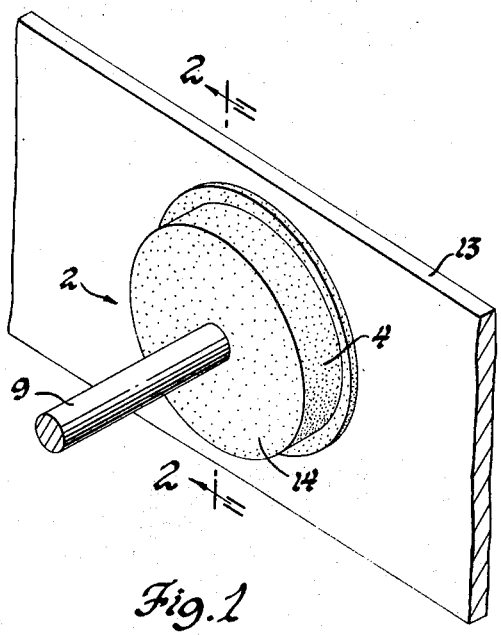
FIG. 1 is a perspective view of a portion of a panel having a grommet according to the invention mounted therein.

In the drawings, reference numeral 2 collectively designates a grommet having an elastomeric body 4 formed with an opening 6. Opening 6 has a sealing surface indicated by reference numeral 8 in FIGS. 2 and 3 for engaging a member 9 supported by the grommet 2 so that the member 9 can extend through the opening 11 in a panel 13. The member 9 may be a wire, conduit, cable, rod, or the like that is required to extend through the panel 13, and wherein it is necessary or desirable to prevent vibration of the member 9 and also to seal the opening in the panel to prevent the passage of air, moisture or sound, and in some cases, to electrically insulate the member 9 from the panel 13.

Figure 2:
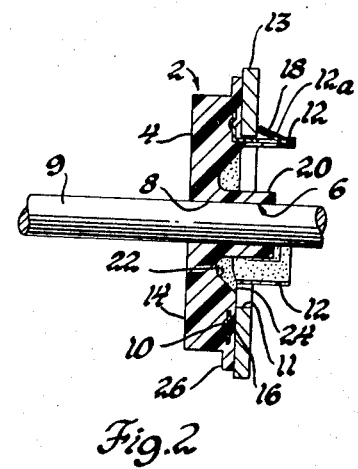
FIG. 2 is a sectional view taken on line 2—2 of FIG. 1.

Embedded in the elastomeric body 4 is a base member 10 of metal or other non-elastomeric material having a plurality of integral fingers 12 formed thereon. The base member 10 is in the form of a ring which is embedded in the elastomeric body 4 in a position such that the fingers 12 project from one side of the elastomeric body 4 for retaining the grommet on panel 13 in such a manner that the elastomeric body 4 is held in sealing engagement with the surface of the panel as illustrated in FIG. 2. Base member 10 is molded into the soft, resilient, elastomeric material of body 4 such that it is spaced between the outer side 14 of the elastomeric body 4 and the inner side 16 of the elastomeric body. Fingers 12 project from side 16 of body 4 and serve to secure the grommet to the panel in such a manner that side 16 is drawn into sealing engagement with the surface of the panel surrounding opening 11.

Each of the fingers 12 is formed with a locking tang 18 which is struck from the material of the fingers. Each of the locking tangs 18 extends outwardly from its respective finger 12 and projects away from the outer end of the respective finger 12 toward side 16 of the elastomeric body 4. The free end of each of the tangs 18 is spaced from side 16 of the elastomeric body. Each of the tangs 18 is resiliently deflectable relative to the axis of body 4 toward its respective finger 12 when the finger 12 is inserted in a panel opening by engaging the edge of the opening until the free end of the tang clears the opening whereupon it snaps outwardly into engagement with the opposite side of the panel from the elastomeric body. As shown in FIG. 2, the free ends of the tangs engage the opposite side of panel 13 from the elastomeric body 4 to secure grommet 2 to the panel 13 and hold the elastomeric body 4 in sealing engagement with the panel around opening 11. The elastomeric material is compressed against the surface of the panel surrounding opening 11 when the free ends of the tangs engage the opposite side of the panel from body 4. The free ends of the tangs positively engage the opposite side of the panel from the body 4 and the grommet cannot be removed merely by applying an axial force on the grommet in a direction away from the panel (or toward the left in FIG. 2) due to the positive engagement of the ends of tangs 18 with the side of the panel opposite the body 4.

Figure 3:
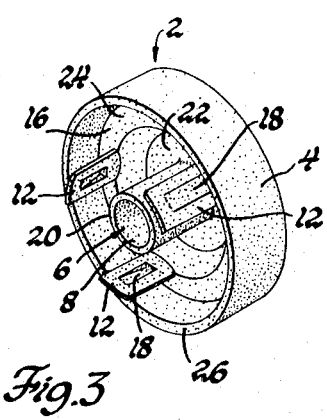
FIG. 3 is a perspective view of the grommet of FIGS. 1 and 2.
Figure 4:
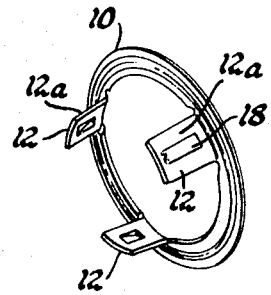
FIG. 4 is a perspective view of the non-elastomeric base member and attachment fingers of the grommet of FIGS. 1 through 3.

An axially extending projection 20 is formed on side 16 of the elastomeric body 4, the opening 6 in the elastomeric body 4 extending through projection 20. Side 16 of the elastomeric body 4 in the illustrated embodiment is further formed with a recess 22 surrounding the projection 20, and a generally planar surface 24 is formed on side 16 surrounding the recess 22. The planar surface 24 is substantially normal to the axis of opening 6 and its inner periphery defines the outer periphery of the recess 22 in the illustrated embodiment. A peripheral sealing ridge 26 is formed on the elastomeric body 4 and projects from side 16 of the elastomeric body a distance such that it is flattened into sealing engagement with the surface of the panel 13 surrounding the panel opening 11 when the free ends of the tangs 18 engage the opposite sides of the panel as shown in FIG. 2. The sealing ridge 26 projects from side 16 of the elastomeric body beyond the free ends of tangs 18 in its unstressed condition as illustrated in FIG. 3. In the illustrated embodiment, three fingers 12 are substantially equally spaced from each other about the inner periphery of the planar surface 24.

The grommet 2 is mounted on the panel 13 as illustrated in FIGS. 1 and 2 by inserting the fingers 12 in the opening 11. As the fingers 12 pass through the opening 11, the tangs 18 are deflected toward their respective fingers 12 by engaging the edge of the opening 11 until the free ends of the tangs clear the opening 11 whereupon the tangs resiliently return to their unstressed configuration and the free ends of the tangs snap outwardly to overlie the surface of the panel surrounding the opening 11 on the opposite sides of the panel from the elastomeric body 4. The engagement of the free ends of the tangs 18 with the panel prevents removal of the grommet from the panel. Consequently, the grommet is easily mounted in self-locking, sealing engagement on the panel 13 merely by inserting the fingers 12 through the panel opening.

In the illustrated embodiment, the fingers 12 are curved inwardly about the axis of body 4 and opening 6, and can accordingly lie close to the periphery of the opening 11 in panel 13. Thus, the diameter of a circle including the outer surfaces 12a of the fingers 12 may be only slightly smaller than the diameter of the panel opening 11. As the fingers 12 are inserted into the panel opening 11, the fingers may resiliently deflect inwardly with respect to the base member, or with respect to the axis of body 4, in addition to the deflection of the tangs 18, until the tangs clear the opening 11 and assume the position shown in FIG. 2.

The material of the elastomeric body 4 may be soft, resilient rubber, foam rubber, or elastomeric foam plastics. Several examples of suitable material for the elastomeric body 4 are disclosed in the aforementioned Millard U.S. Pat. No. 3,182,119.

While the panel 13 is illustrated as having a flat surface surrounding the panel opening 11, the configuration of the elastomeric body 4 and peripheral sealing ridge 26 is such that a panel having a concave, convex, recessed, raised or other non-flat or irregular surface surrounding the opening receiving the grommet can be sealed by the grommet.

Preferably, the base member 10 is completely embedded in the elastomeric material and, if desired, the fingers 12 may be coated with elastomeric material as illustrated in FIGS. 2 and 3.

While a specific embodiment of the invention has been illustrated and described in the foregoing specification and accompanying drawings, it should be understood that the invention is not limited to the exact construction shown, but that various alterations in the construction and arrangement of parts is possible without departing from the scope and spirit of the invention.

The embodiments of the invention in which an exclusive property or privilege is claimed are defined as follows:

1. A grommet of the type wherein an elastomeric body is formed with an opening having a sealing surface for engaging a member to be supported by the grommet, a plurality of fingers of non-elastomeric material embedded in said elastomeric body and projecting from one side of said elastomeric body for retaining the grommet on a panel having an opening to be sealed by said grommet in such a manner that the elastomeric body is held in sealing engagement with the surface of the panel whereby a member such as a wire, conduit, cable, rod, or the like can be supported in the opening of said elastomeric body and extend through the opening in the panel, wherein the improvement comprises each of said fingers having a resilient locking tang struck therefrom, each of said locking tangs extending outwardly from its respective finger and projecting away from the outer end of said respective finger toward said one side of said elastomeric body with the free end of the tang being spaced from said one side of said elastomeric body, each of said tangs being resiliently deflectable relative to the axis of said body when its respective finger is inserted in a panel opening until the free end of the tang clears the opening and is released to spring snap into engagement with the opposite side of the panel from said elastomeric body to secure the grommet to the panel and hold said elastomeric body in sealing engagement with the panel, and wherein a recess is formed in said one side of said elastomeric body and surrounds said opening.

2. A grommet of the type wherein an elastomeric body is formed with an opening having a sealing surface for engaging a member to be supported by the grommet, a plurality of fingers of non-elastomeric material embedded in said elastomeric body and projecting from one side of said elastomeric body for retaining the grommet on a panel having an opening to be sealed by said grommet in such a manner that the elastomeric body is held in sealing engagement with the surface of the panel whereby a member such as a wire, conduit, cable, rod, or the like can be supported in the opening of said elastomeric body and extend through the opening in the panel, wherein the improvement comprises each of said fingers having a resilient locking tang struck therefrom, each of said locking tangs extending outwardly from its respective finger and projecting away from the outer end of said respective finger toward said one side of said elastomeric body with the free end of the tang being spaced from said one side of said elastomeric body, each of said tangs being resiliently deflectable relative to the axis of said body when its respective finger is inserted in a panel opening until the free end of the tang clears the opening and is released to spring snap into engagement with the opposite side of the panel from said elastomeric body to secure the grommet to the panel and hold said elastomeric body in sealing engagement with the panel; and including an axially extending projection formed on said one side of said elastomeric body, the opening in said elastomeric body extending through said projection; a recess formed in said one side of said elastomeric body surrounding said projection; a generally planar surface formed on said one side of said elastomeric body surrounding said recess and lying in a plane normal to the axis of the opening in said elastomeric body; and a pheripheral sealing ridge formed on said elastomeric body and projecting from said one side of said elastomeric body a distance such that it is flattened into sealing engagement with the surface of the panel surrounding the opening in the panel when the free ends of said tangs engage the opposite sides of the panel.

3. A grommet as claimed in claim 2 wherein said sealing ridge projects from said one side of said elastomeric body beyond the free ends of said tangs in its unstressed condition.

4. A grommet as claimed in claim 3 wherein said plurality of fingers are substantially equi-spaced about the inner periphery of said planar surface.

5. A grommet as claimed in claim 2 wherein said fingers are curved inwardly about the axis of said elastomeric body and are resiliently deflectable relative to said base member inwardly toward the axis of said elastomeric body when the fingers are inserted in an opening of a size such that said fingers are in close fitting relationship therewith until said tangs clear said opening.

6. A grommet of the type wherein an elastomeric body is formed with an opening having a sealing surface for engaging a member to be supported by the grommet, a plurality of fingers of non-elastomeric material embedded in said elastomeric body and projecting from one side of said elastomeric body for retaining the grommet on a panel having an opening to be sealed by said grommet in such a manner that the elastomeric body is held in sealing engagement with the surface of the panel whereby a member such as a wire, conduit, cable, rod, or the like can be supported in the opening of said elastomeric body and extend through the opening in the panel, wherein the improvement comprises each of said fingers having a resilient locking tang struck therefrom, each of said locking tangs extending outwardly from its respective finger and projecting away from the outer end of said respective finger toward said one side of said elastomeric body with the free end of the tang being spaced from said one side of said elastomeric body, each of said tangs being resiliently deflectable relative to the axis of said body when its respective finger is inserted in a panel opening until the free end of the tang clears the opening and is released to spring snap into engagement with the opposite side of the panel from said elastomeric body to secure the grommet to the panel and hold said elastomeric body in sealing engagement with the panel; and wherein a base member of non-elastomeric material is embedded in said elastomeric body and said fingers are integrally formed on said base member; and wherein said fingers are curved inwardly about the axis of said elastomeric body and are resiliently deflectable relative to said base member inwardly toward the axis of said elastomeric body when the fingers are inserted in an opening of a size such that said fingers are in close fitting relationship therewith until said tangs clear said opening; and including an axially extending projection formed on said one side of said elastomeric body, the opening in said elastomeric body extending through said projection; a recess formed in said one side of said elastomeric body surrounding said projection; a generally planar surface formed on said one side of said elastomeric body surrounding said recess and lying in a plane normal to the axis of the opening in said elastomeric body; and a peripheral sealing ridge formed on said elastomeric body and projecting from said one side of said elastomeric body a distance such that it is flattened into sealing engagement with the surface of the panel surrounding the opening in the panel when the free ends of said tangs engage the opposite sides of the panel.

7. A grommet as claimed in claim 6 wherein said sealing ridge projects from said one side of said elastomeric body beyond the free ends of said tangs in its unstressed condition.

8. A grommet as claimed in claim 7 wherein said plurality of fingers are substantially equi-spaced about the inner periphery of said planar surface.

* * * * *